Oct. 8, 1935.   D. L. CHESNUT   2,016,890
ELECTRICAL LOAD CONTROL SYSTEM
Filed April 4, 1933
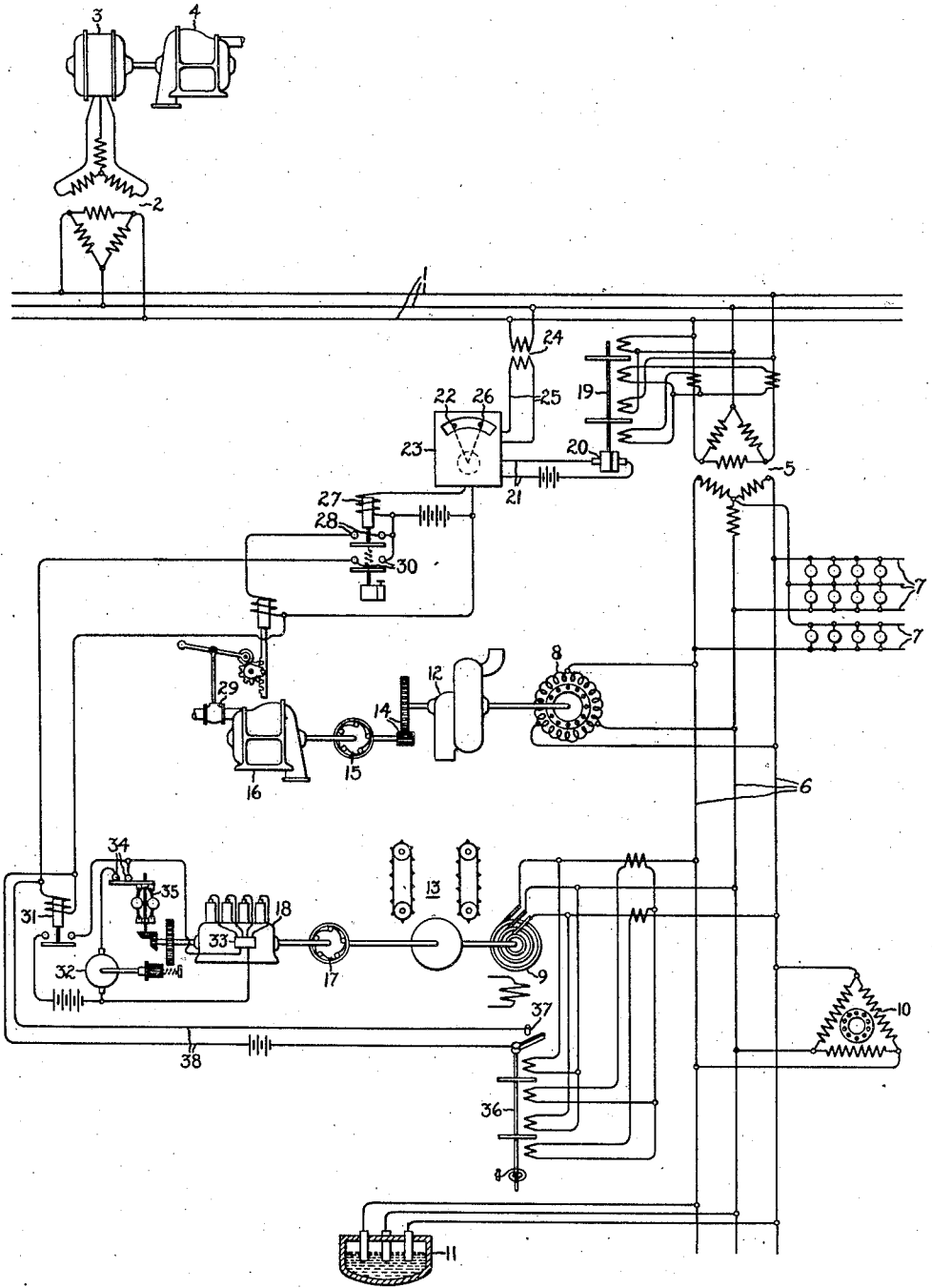
Inventor:
Dewey L. Chesnut,
by Charles E. Tullar
His Attorney.

Patented Oct. 8, 1935

2,016,890

UNITED STATES PATENT OFFICE

2,016,890

ELECTRICAL LOAD CONTROL SYSTEM

Dewey L. Chesnut, Trenton, N. J., assignor to General Electric Company, a corporation of New York Application April 4, 1933, Serial No. 664,364

16 Claims. (Cl. 290—4)

My invention relates to electrical load control systems, and more particularly to automatically operated electrical load control systems.

By load control, I mean to include both the control of the instantaneous load value, such for example as the control of momentary overloads, as well as the control of the integrated load value, such for example as the control of the maximum demand. Commercial users of electric power are usually subjected to a charge known as a demand charge, which represents the fixed charges on the electrical equipment which must be kept in readiness to supply their maximum power demand. Power demand is usually measured by the number of kilowatt hours of energy used in a given arbitrary time period. Maximum power demand is the power demand of a consumer which cannot be exceeded without subjecting the consumer to a new and higher demand charge.

In view of the above, it is often desirable to provide automatic load control arrangements for automatically preventing the establishment of a new and higher maximum demand, or to lower the level of an existing power demand.

Instantaneous load may be controlled by any suitable control device which responds to the instantaneous power flow, or load, in watts while power demand may be controlled by any suitable time controlled device which also integrates the energy demand of the load. Devices of the latter type are of two general classifications, namely, those which call for a reduction in load or power when the maximum demand has been reached and those which control the load or power during the demand period in such a manner as to prevent the maximum demand from being exceeded. The details of such power demand controllers are shown by way of example in Figs. 2 and 1, respectively, of Pauly Patent No. 1,201,619, which is assigned to the assignee of the present application.

In accordance with my invention, I provide one or more auxiliary prime movers for substantially directly reducing electrical load. Thus, in almost any cases where electrical power is used commercially, there are electric motors for operating mechanical loads, and my invention includes the mechanical coupling of the auxiliary prime movers to these electric motors or to their loads and so controlling these prime movers from any of the above mentioned control devices that the power output of the prime mover may be varied in a manner to control the electrical load. Thus by increasing the power output of the prime mover it can be made to assume any desired fraction of the mechanical load and thereby reduce the electrical power required by the motor which drives this load. Furthermore, if desired and if the motor can be made to operate in a regenerative manner, the power output of the prime mover may even be increased to such an extent that it operates the motor as a generator, thereby to pump electrical power back into the power supply circuit or system.

The prime movers may be of any suitable type, such as steam turbines, internal combustion engines or water wheels and they may be coupled to the mechanical load or motor in such a manner as to run at all times with these devices, or they may be coupled to these devices through a clutching arrangement, such as an overrunning clutch, so that when the prime mover is not needed it can come to rest.

By the term "mechanical load" I wish to be understood as including electric generators for such machines are true mechanical loads on motors which are driven from a power supply circuit or system.

By the use of one or more prime movers, any desired portion of the total load on a power supply circuit may be transferred automatically, or at will, to the prime mover in such a manner as to control or reduce the electrical load on the circuit.

An object of my invention is to provide a new and improved electrical load control system.

Another object of my invention is to provide a load control system in which a prime mover may be made to assume directly any desired fraction of a mechanical load which is normally driven from a motor energized from an electrical supply circuit.

My invention will be better understood from the following description taken in connection with the accompanying drawing, and its scope will be pointed out in the appended claims.

Referring now to the accompanying drawing, I have illustrated therein an embodiment of my invention as applied to a power supply system comprising a three-phase alternating current transmission circuit 1, which is energized through a power transformer 2 from an alternating current generator 3, which is driven by a prime mover, shown as a steam turbine 4. Connected to circuit 1 is a load transformer 5 which transmits power to a load or feeder circuit 6. Connected to load circuit 6 are a plurality of miscellaneous electrical loads shown as a lamp bank 7, an induction motor 8, a synchronous motor 9, an additional induction motor 10 and an electric furnace 11. Motors 8 and 9 have coupled thereto mechanical loads which are shown by way of example as a centrifugal pump 12 and a wood pulp grinder 13, respectively.

Mechanically coupled to motor 8 and pump 12 through a gear reduction 14 and one-way clutch 15 is a steam turbine 16. The gear reduction 14, which may be omitted if desired, permits the use of a small, high speed and relatively inexpensive turbine, while the clutch 15, which may also be omitted if desired, allows the turbine to come to rest when it is not in use. Mechanically connected to synchronous motor 9 and grinder 13 through a clutch 17 is a prime mover shown as an internal combustion engine 18.

Connected to be responsive to the total load on circuit 6 is an integrating watthour meter 19 which is shown connected to the primary side of transformer 5 in a conventional manner. Meter 19 has a commutator and brush arrangement 20 for producing impulses in a circuit 21 which is connected to drive an energy contact 22 of a contact-making demand meter 23 in the conventional manner. Connected to circuit 1 through a potential transformer 24 is a circuit 25 for energizing any suitable means for driving a time contact 26 on meter 23. This means may be any suitable type, such for example as a small synchronous motor which is now often used for driving the time elements of a demand meter. Contacts 22 and 26 are arranged to be moved in a clockwise direction and are periodically reset to given starting positions by the timing mechanism of the meter after equal intervals of time. When the contacts are reset, contact 26, the time contact, is usually not reset quite as far as the energy contact 22, so that when these two contacts start to move clockwise the time contact has a head start on the energy contact.

Contacts 22 and 26 when closed are arranged to energize a contactor or relay 27. This relay has a pair of contacts 28, which when closed by the energization of the relay, complete an energizing circuit for an electromagnetically operated steam admission valve 29 for turbine 16. Relay 27 has an additional set of contacts 30 which are arranged to have a time delayed closing so that they will close a predetermined time after the closure of contacts 28, when the relay is energized. These contacts 30 when closed are adapted to complete an energizing circuit for a relay 31 for controlling the starting of engine 18. As shown, this relay has a pair of contacts which control two parallel circuits, one of which includes a starting motor 32 for engine 18 and the other of which includes the ignition system 33 for the engine 18. Connected in the circuit for energizing the starting motor 32 are a pair of normally closed contacts 34 which are arranged to be opened by a speed responsive centrifugal switch 35 which is arranged to respond to the speed of engine 18.

Connected to respond to the power or load on motor 9 is a contact-making wattmeter 36 which is connected to motor 9 in the conventional manner. This meter has a pair of contacts 37 which are arranged to be closed when the load on motor 9 exceeds a predetermined value, such for example as a value which is sufficient to overload the motor 9. Contacts 37 are connected in an additional energizing circuit 38 for relay 31, so that whenever contacts 37 close relay 31 will be energized.

The operation of the above described embodiment of my invention is as follows:

Assume that turbine 4 is operating generator 3 in a normal manner and that loads 7, 8, 9, 10 and 11 are drawing power from generator 3 through transformer 2, transmission circuit 1, transformer 5 and feeder circuit 6. Under these conditions watthour meter 19 will be operating and will be sending impulses over circuit 21 to meter 23, thereby to drive the energy contact 22. Also the timing means for meter 23 will be energized from circuit 1 through potential transformer 24. Consequently, contacts 22 and 26 will both be moved in a clockwise direction for a predetermined time, after which they will be reset to their original starting positions and will then again move clockwise, the energy contact moving at a rate of speed proportional to the total load on circuit 6 and the time contact moving at a uniform rate, the two contacts being initially separated by a predetermined amount when they are reset. Assume now that the total load on circuit 6 reaches such a value that during the time the contacts 22 and 26 are moving clockwise the energy contact 22 catches up to and engages the time contact 26. When this takes place relay 27 will be energized and its contacts 28 will close. The closure of contacts 28 will actuate steam admission valve 29, thereby starting steam turbine 16 which will come up to speed and as soon as its no-load speed exceeds the speed of the blower or pump 12, when increased by the ratio of the gear reduction 14, the clutch 15 will engage and turbine 16 will supply power to the pump 12 and will thereby assume some of the load of this pump, thereby relieving the motor 8 from some of its load. If desired, the valve 29 may be so set that the steam input to turbine 16 is sufficient to cause this turbine not only to drive the pump 12 but also to increase the speed of the pump 12 above the synchronous speed of the motor 8 so as to reverse the slip of motor 8 and cause it to act as as induction generator to pump power back into the circuit 6.

If the reduction in total load on circuit 6 caused by this operation is sufficient, the speed of meter 19 will be reduced by such an amount that the energy contact 22 will no longer move at a speed as great as the speed of the time contact 26, and consequently these contacts will separate and relay 27 will be deenergized. If, however, the fraction of the total load on circuit 6 which is now being carried by turbine 16 is still insufficient to cause separation of the contacts of the demand meter 23, the contacts 30 of relay 27 will be closed in a predetermined time and the closure of these contacts will in turn cause the energization of relay 31. As soon as relay 31 is energized it completes the circuit for energizing the starter 32 and the ignition system 33 of engine 18 thereby starting this engine. As soon as engine 18 starts and comes up to somewhere near its normal speed, the speed responsive device 35 will open its contacts 34 thereby deenergizing the starting motor 32. As soon as motor 18 reaches a speed which is greater than the speed of grinder 13, and motor 9, clutch 17 will engage and engine 18 will assume some of the load of grinder 13, the amount depending upon the throttle setting of the engine. Also, if desired, this throttle setting may be such as to cause engine 18 to drive motor 9 as a synchronous generator and pump power back into the system.

Probably the simultaneous operation of the prime movers 16 and 18 will reduce the effective load on circuit 6 to such a value that the contacts of the demand meter 23 will separate. If not, additional prime movers can be added to the loads driven by any additional motors connected to the system. If the loads carried by prime movers 16 and 18 are sufficient to cause a separation of contacts 22 and 26 the two prime movers will be shut down because the deenergization of relay 27 by the separation of the contacts of the meter will cause valve 29 to shut off the steam for turbine 16 and will cause relay 31 to break the ignition circuit for engine 18. If the contacts of the meter 23 do not separate even after prime movers 16 and 18 are operating up to their capacity and if no additional prime movers are supplied, a new maximum demand will probably be established unless during the demand interval the total loads on the circuit 6 fall below a value sufficient to cause separation of the contacts of the meter. However, if this does not occur, the contacts will eventually separate when they are reset to their starting position.

In addition to the above operation, if at any time the power acquired by grinder 13 exceeds the safe loading of motor 9 contacts 37 will close, thereby energizing relay 31 and starting engine 18 which will then assume some of the load of grinder 13 thereby preventing injury or loss of synchronism of motor 9. As soon as this overload is removed contacts 37 will separate and engine 18 will be shut down.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, a load, electrical means for operating said load from said circuit, a prime mover for operating said load, and means responsive to the load on said circuit for controlling the energy input to said prime mover before the load thereon changes.

2. In combination, an electric power circuit, a load, electrical means for operating said load from said power circuit, a prime mover for directly operating said load, means independent of the speed of said prime mover for varying its power output, and means responsive to the load on said circuit for operating said prime mover power output varying means.

3. In combination, an electric supply circuit, an electric motor connected to said circuit, a variable mechanical load coupled to said motor, a prime mover, and means responsive to the load on said circuit for initiating a change in power transfer between the prime mover and the mechanical load before said transfer is changed by any other means.

4. In combination, an electric supply circuit, a plurality of individual electric loads connected to said supply circuit, a mechanical load driven by one of said electric loads, a prime mover, and means responsive to the total load on said circuit for causing said prime mover to assume some of said mechanical load.

5. In combination, an electric supply circuit, a plurality of variable loads including a motor load connected to said circuit, a mechanical load coupled to said motor, a prime mover coupled to said motor, and means responsive to the total load on said circuit for causing said prime mover to drive said motor as a generator.

6. In combination, an electric supply circuit, a contact making integrating demand meter for said circuit, a motor load connected to said circuit, a variable mechanical load driven by said motor, a prime mover mechanically connected to said load, and means for causing said contact making integrating demand meter to control the output of said prime mover.

7. In combination, an electric supply circuit, a contact making demand meter for said circuit, an electric motor connected to said circuit, a mechanical load driven by said motor, a steam turbine, an overrunning clutch between said load and said turbine, and means controlled by said contact making meter for controlling the steam input to said turbine.

8. In combination, an alternating current power supply circuit, a contact making demand meter connected to be responsive to the power demand on said circuit, said meter having a time contact and an energy contact, a plurality of variable loads including an electric motor connected to said circuit, a mechanical load connected to be driven by said motor, a steam turbine for also driving said load, and means controlled by the contacts of said meter for varying the power output of said turbine.

9. In combination, an alternating current power supply circuit, a contact making demand meter connected to be responsive to the power demand on said circuit, said meter having a time contact and an energy contact, a plurality of variable loads including an induction motor connected to said circuit, a mechanical load connected to be driven by said motor, a steam turbine for also driving said load, and means controlled by the contacts of said meter for varying the power output of said turbine over a range wide enough to include causing said motor to regenerate and thereby return electrical energy to said circuit.

10. In combination, an alternating current power supply circuit, a contact making demand meter connected to be responsive to the power demand on said circuit, said meter having a time contact and an energy contact, a plurality of variable loads including a synchronous motor connected to said circuit, a mechanical load connected to be driven by said motor, an internal combustion engine for also driving said load, and means controlled by the contacts of said meter for controlling the power output of said engine.

11. In combination, an electric power circuit, an electric motor connected thereto, a mechanical load arranged to be driven by said motor, a prime mover arranged to aid said motor in driving said load, and means responsive to the electric power required by said motor for varying the energy input to said prime mover before the load thereon changes.

12. In combination, an electric power circuit, a plurality of motor loads connected to said circuit, separate loads driven by said motors, separate prime movers connected respectively to help drive said loads, and means responsive to the load on said circuit for sequentially controlling the power output of said prime movers.

13. In an electrical load limiting system, an electric power supply circuit, an electrical load on said circuit including an electric motor for driving a mechanical load, a normally idle prime mover adapted to relieve said motor of some of said mechanical load, and electrical means responsive to a predetermined maximum load on said circuit for causing said prime mover to assist said motor in driving said mechanical load whereby the electrical load on said circuit is reduced.

14. In an electrical power demand limiting system, an electric power supply circuit, a plurality of electrical loads connected to said circuit including an electric motor for driving a mechanical load, a normally idle prime mover adapted also to drive said mechanical load, an integrating power demand controller responsive to the load on said circuit, said controller being arranged to cause said prime mover to assist said motor in order that the maximum demand of said circuit will not be exceeded.

15. In an electrical load limiting system, an electric power supply circuit, an electric motor connected to said circuit, a mechanical load connected to be driven by said motor, a turbine for aiding said motor in driving said load, and means responsive to the electrical load on said circuit for directly controlling the inlet valve of said turbine.

16. In an electrical load limiting system, an electric power supply circuit, an electric motor connected to said circuit, a mechanical load connected to be driven by said motor, an internal combustion engine for aiding said motor in driving said load, and means responsive to the electrical load on said circuit for controlling the starting and stopping of said engine.

DEWEY L. CHESNUT.